(12) United States Patent
Matsumoto

(10) Patent No.: US 9,021,836 B2
(45) Date of Patent: *May 5, 2015

(54) GLASS WELDING METHOD AND GLASS LAYER FIXING METHOD

(75) Inventor: Satoshi Matsumoto, Hamamatsu (JP)

(73) Assignee: Hamamatsu Photonics K.K., Hamamatsu-shi, Shizuoka (JP)

(*) Notice: Subject to any disclaimer, the term of this patent is extended or adjusted under 35 U.S.C. 154(b) by 32 days.

This patent is subject to a terminal disclaimer.

(21) Appl. No.: 13/511,735

(22) PCT Filed: Sep. 17, 2010

(86) PCT No.: PCT/JP2010/066142
§ 371 (c)(1),
(2), (4) Date: May 24, 2012

(87) PCT Pub. No.: WO2011/065109
PCT Pub. Date: Jun. 3, 2011

(65) Prior Publication Data
US 2012/0247153 A1    Oct. 4, 2012

(30) Foreign Application Priority Data
Nov. 25, 2009   (JP) ................. P2009-267590

(51) Int. Cl.
*C03C 8/24* (2006.01)
*H01J 9/26* (2006.01)
(Continued)

(52) U.S. Cl.
CPC . *H01J 9/261* (2013.01); *C03C 8/24* (2013.01); *B23K 26/0021* (2013.01); *B23K 26/18* (2013.01); *C03C 27/06* (2013.01)

(58) Field of Classification Search
CPC .............. B32B 17/00; B32B 17/10036; B32B 17/10055; C03C 27/06; C03C 8/24; C03C 23/0025; C03C 3/21; C03C 8/08; C03C 27/10; C03C 17/04; C03C 8/245; C03C 3/072; C03C 8/04; C03C 27/005; C03C 3/066; C03C 3/17; C03C 3/19; C03C 8/16; C03C 8/20
USPC ............ 65/146–151, 138, 140, 155; 438/107, 438/455; 428/34; 156/99
See application file for complete search history.

(56) References Cited

U.S. PATENT DOCUMENTS 3,453,097 A    7/1969 Hafner
3,663,793 A *  5/1972 Petro et al. ............... 219/121.69
(Continued)

FOREIGN PATENT DOCUMENTS

CN   1329395    1/2002
CN   1738777    2/2006
(Continued)

OTHER PUBLICATIONS

Yasui, Hideaki et al. JP 20021220, Method for Manufacturing Image Display Device, Manufacturing Apparatus, and Image Display Device Manufactured by Using the Same. Translated by the Mcelroy translation company, United states patent and trademark office Jun. 2012.*

(Continued)

Primary Examiner — Jodi C Franklin
(74) Attorney, Agent, or Firm — Drinker Biddle & Reath LLP

(57) ABSTRACT

When melting a glass layer 3 by irradiation with laser light L1 along a region to be fused R, the glass layer 3 is irradiated with the laser light L1 having a first heat input along the region to be fused R, so as to gasify a binder and melt a glass frit 2, and the heat input is switched when the melting ratio of the glass layer 3 in a direction intersecting an advancing direction of the laser light L1 exceeds a predetermined value, so as to irradiate the glass layer 3 with the laser light L1 having a second heat input smaller than the first heat input along the region to be fused R, thereby gasifying the binder and melting the glass fit 2, thus fixing the glass layer 3 to a glass member 4.

7 Claims, 14 Drawing Sheets

(51) Int. Cl.
B23K 26/00 (2014.01)
B23K 26/18 (2006.01)
C03C 27/06 (2006.01)

(56) References Cited

U.S. PATENT DOCUMENTS

| | | | |
|---|---|---|---|
| 4,343,833 A | 8/1982 | Sawae et al. | |
| 5,489,321 A | 2/1996 | Tracy et al. | |
| 6,565,400 B1 | 5/2003 | Lee et al. | |
| 7,371,143 B2* | 5/2008 | Becken et al. | 445/25 |
| 7,641,976 B2* | 1/2010 | Lamberson et al. | 428/428 |
| 7,820,941 B2 | 10/2010 | Brown et al. | |
| 7,834,550 B2* | 11/2010 | Lee et al. | 313/512 |
| 7,932,670 B2* | 4/2011 | Yoo et al. | 313/505 |
| 8,063,561 B2* | 11/2011 | Choi et al. | 313/512 |
| 8,440,479 B2* | 5/2013 | Nguyen et al. | 438/29 |
| 8,490,434 B2* | 7/2013 | Watanabe et al. | 65/155 |
| 8,516,852 B2* | 8/2013 | Matsumoto et al. | 65/36 |
| 2004/0069017 A1* | 4/2004 | Li et al. | 65/43 |
| 2004/0207314 A1 | 10/2004 | Aitken et al. | |
| 2005/0103755 A1 | 5/2005 | Baker et al. | |
| 2006/0082298 A1 | 4/2006 | Becken et al. | |
| 2007/0007894 A1* | 1/2007 | Aitken et al. | 313/512 |
| 2007/0053088 A1 | 3/2007 | Kranz et al. | |
| 2007/0128967 A1* | 6/2007 | Becken et al. | 445/25 |
| 2007/0170845 A1* | 7/2007 | Choi et al. | 313/504 |
| 2007/0173167 A1* | 7/2007 | Choi | 445/25 |
| 2008/0106194 A1 | 5/2008 | Logunov et al. | |
| 2008/0124558 A1* | 5/2008 | Boek et al. | 428/427 |
| 2008/0135175 A1 | 6/2008 | Higuchi | |
| 2008/0182062 A1 | 7/2008 | Becken et al. | |
| 2009/0071588 A1 | 3/2009 | Kimura et al. | |
| 2009/0080055 A1 | 3/2009 | Baur et al. | |
| 2009/0086325 A1 | 4/2009 | Liu et al. | |
| 2009/0110882 A1 | 4/2009 | Higuchi | |
| 2009/0142984 A1 | 6/2009 | Logunov et al. | |
| 2009/0297861 A1* | 12/2009 | Banks et al. | 428/428 |
| 2009/0297862 A1* | 12/2009 | Boek et al. | 428/428 |
| 2009/0308105 A1 | 12/2009 | Pastel et al. | |
| 2010/0006228 A1* | 1/2010 | Abe et al. | 156/356 |
| 2010/0095705 A1* | 4/2010 | Burkhalter et al. | 65/61 |
| 2010/0116119 A1 | 5/2010 | Bayne | |
| 2010/0129666 A1 | 5/2010 | Logunov et al. | |
| 2010/0154476 A1* | 6/2010 | Becken et al. | 65/36 |
| 2010/0267307 A1 | 10/2010 | Park et al. | |
| 2010/0304513 A1 | 12/2010 | Nguyen et al. | |
| 2011/0001424 A1 | 1/2011 | Logunov et al. | |
| 2011/0061789 A1* | 3/2011 | Matsumoto | 156/99 |
| 2011/0067448 A1* | 3/2011 | Matsumoto et al. | 65/36 |
| 2011/0072855 A1* | 3/2011 | Matsumoto et al. | 65/36 |
| 2011/0088430 A1* | 4/2011 | Matsumoto | 65/43 |
| 2011/0088431 A1* | 4/2011 | Matsumoto | 65/43 |
| 2011/0135857 A1 | 6/2011 | Logunov et al. | |
| 2011/0169108 A1* | 7/2011 | Gardner et al. | 257/417 |
| 2011/0223360 A1* | 9/2011 | Shibuya et al. | 428/34 |
| 2011/0223371 A1* | 9/2011 | Kawanami | 428/76 |
| 2011/0256407 A1 | 10/2011 | Boek et al. | |
| 2011/0265518 A1 | 11/2011 | Matsumoto et al. | |
| 2012/0111059 A1* | 5/2012 | Watanabe et al. | 65/43 |
| 2012/0147538 A1* | 6/2012 | Kawanami et al. | 361/679.01 |
| 2012/0151965 A1* | 6/2012 | Matsumoto et al. | 65/43 |
| 2012/0156406 A1* | 6/2012 | Banks et al. | 428/34.4 |
| 2012/0222450 A1* | 9/2012 | Lamberson et al. | 65/43 |
| 2012/0234048 A1* | 9/2012 | Matsumoto | 65/56 |
| 2012/0240628 A1* | 9/2012 | Matsumoto | 65/43 |
| 2012/0240629 A1* | 9/2012 | Matsumoto | 65/43 |
| 2012/0240630 A1* | 9/2012 | Matsumoto | 65/43 |
| 2012/0240631 A1* | 9/2012 | Matsumoto | 65/43 |
| 2012/0240632 A1* | 9/2012 | Matsumoto | 65/43 |
| 2012/0240633 A1* | 9/2012 | Matsumoto | 65/43 |
| 2012/0247153 A1* | 10/2012 | Matsumoto | 65/43 |
| 2012/0260694 A1* | 10/2012 | Matsumoto | 65/43 |
| 2012/0285200 A1* | 11/2012 | Tanaka | 65/43 |
| 2012/0287026 A1 | 11/2012 | Masuda | |
| 2012/0318023 A1* | 12/2012 | Shimomura | 65/43 |
| 2012/0320444 A1 | 12/2012 | Baur et al. | |
| 2013/0011598 A1* | 1/2013 | Kawanami et al. | 428/76 |
| 2013/0104980 A1* | 5/2013 | Sridharan et al. | 136/259 |
| 2013/0111953 A1* | 5/2013 | Maloney et al. | 65/43 |
| 2013/0134396 A1* | 5/2013 | Shimomura et al. | 257/40 |
| 2013/0174608 A1* | 7/2013 | Takeuchi et al. | 65/40 |
| 2013/0237115 A1 | 9/2013 | Choi et al. | |
| 2013/0280981 A1 | 10/2013 | Lee | |
| 2013/0314760 A1 | 11/2013 | Baur et al. | |

FOREIGN PATENT DOCUMENTS

| | | |
|---|---|---|
| CN | 1798708 | 7/2006 |
| CN | 1798710 | 7/2006 |
| CN | 1836177 | 9/2006 |
| CN | 101005915 | 7/2007 |
| CN | 101095247 | 12/2007 |
| CN | 101103429 | 1/2008 |
| CN | 101139165 | 3/2008 |
| CN | 100409392 C | 8/2008 |
| CN | 101312234 | 11/2008 |
| CN | 101434453 | 5/2009 |
| CN | 101501808 | 8/2009 |
| CN | 102056858 | 5/2011 |
| JP | 2-120259 | 5/1990 |
| JP | 5166462 | 7/1993 |
| JP | 2002-015108 | 1/2002 |
| JP | 2002-224871 | 8/2002 |
| JP | 2002-287107 | 10/2002 |
| JP | 2002-366050 | 12/2002 |
| JP | 2002-367514 | 12/2002 |
| JP | 2002366050 A * | 12/2002 |
| JP | 2004-182567 | 7/2004 |
| JP | 2005-007665 | 1/2005 |
| JP | 2005-213125 | 8/2005 |
| JP | 2006-151774 | 6/2006 |
| JP | 2006-524419 | 10/2006 |
| JP | 2007-90405 | 4/2007 |
| JP | 2007-264135 | 10/2007 |
| JP | 2008-115057 | 5/2008 |
| JP | 2008-115067 | 5/2008 |
| JP | 2008-127223 | 6/2008 |
| JP | 2008-527655 | 7/2008 |
| JP | 2009-123421 | 6/2009 |
| JP | 2009-196862 | 9/2009 |
| KR | 10-0350323 | 3/2002 |
| KR | 10-2007-0003681 | 1/2007 |
| TW | 1495409 | 7/2002 |
| TW | 200516064 | 5/2005 |
| TW | 1255934 | 6/2006 |
| TW | 200733787 | 9/2007 |
| TW | 200737370 | 10/2007 |
| TW | 200822789 | 5/2008 |
| TW | 200911438 | 3/2009 |
| TW | 200944908 | 11/2009 |
| WO | WO 2007/067533 | 6/2007 |
| WO | WO 2007067533 A2 * | 6/2007 |
| WO | WO 2009/131144 | 10/2009 |
| WO | 2009/157282 | 12/2009 |
| WO | WO 2009/150975 | 12/2009 |
| WO | WO 2009/150976 | 12/2009 |
| WO | WO 2009-157281 | 12/2009 |

OTHER PUBLICATIONS

U.S. Office Action dated Jun. 6, 2012 that issued in U.S. Appl. No. 13/345,199 including Double Patenting Rejections on pp. 5-8.
U.S. Office Action dated Jun. 28, 2012 that issued in U.S. Appl. No. 12/994,320 including Double Patenting Rejections on pp. 7-9.
U.S. Office Action dated Jul. 9, 2012 that issued in U.S. Appl. No. 12/994,321 including Double Patenting Rejections on pp. 7-9.
Cheung, Kerry, "Die-Level Glass Frit Vacuum Packaging for a Micro-Fuel Processor System," Massachusetts Institute of Technology, Jun. 2005, pp. 17-19.
U.S. Office Action dated Jan. 22, 2013 that issued in U.S. Appl. No. 13/345,199 including Double Patenting Rejections on pp. 6-8.
JP 20022366050 (Human Translation), retrieved from USPTO Translation Services and attached to the U.S. Office Action dated Apr. 25, 2013 in U.S. Appl. No 12/994,539.

(56) References Cited

OTHER PUBLICATIONS

JP 2008115057 (Human Translation), retrieved from USPTO Translation Services and attached to the U.S. Office Action dated Apr. 25, 2013 in U.S. Appl. No 12/994,539.
U.S. Office Action dated Apr. 25, 2013 that issued in U.S. Appl. No. 12/994,539 including Double Patenting Rejections on pp. 5-8.
JP 20022366050 (Machine Translation), as attached to Office Action dated Jun. 1, 2012 in U.S. Appl. No. 12/994,354.
JP 2008115057 (Machine Translation), as attached to Office Action dated Jun. 1, 2012 in U.S. Appl. No. 12/994,354.
U.S. Office Action dated May 9, 2013 that issued in U.S. Appl. No. 12/994,399 including Double Patenting Rejections on pp. 6-10.
U.S. Office Action dated Jan. 28, 2014 that issued in U.S. Appl. No. 13/511,688 including Double Patenting Rejections on pp. 4-8.
U.S. Office Action dated Jun. 3, 2014 that issued in U.S. Appl. No. 13/511,683 including Double Patenting Rejections on pp. 5-11.
U.S. Office Action dated Jul. 2, 2014 that issued in U.S. Appl. No. 13/511,754 including Double Patenting Rejections on pp. 5-8.
U.S. Office Action dated Jul. 1, 2014 that issued in U.S. Appl. No. 13/511,738 including Double Patenting Rejections on pp. 4-5.
U.S. Office Action dated Jul. 31, 2014 that issued in U.S. Appl. No. 12/994,354 including Double Patenting Rejections on pp. 7-10.
U.S. Office Action dated Jan. 22, 2014 that issued in U.S. Appl. No. 13/509,112 including Double Patenting Rejections on pp. 4-5.
U.S. Office Action dated Jul. 1, 2014 that issued in U.S. Appl. No. 13/511,747 including Double Patenting Rejections on pp. 4-5.
U.S. Office Action dated Apr. 25, 2014 that issued in U.S. Appl. No. 13/511,721 including Double Patenting Rejections on pp. 2-3.
U.S. Office Action dated Feb. 24, 2015 that issued in U.S. Appl. No. 13/345,199 including Double Patenting Rejections on pp. 4-14.

* cited by examiner

GLASS WELDING METHOD AND GLASS LAYER FIXING METHOD

TECHNICAL FIELD

The present invention relates to a glass fusing method for manufacturing a glass fusing structure by fusing glass members to each other and a glass layer fixing method therefor.

BACKGROUND ART

Known as a conventional glass fusing method in the above-mentioned technical field is a method which burns a glass layer containing a laser-light-absorbing pigment onto one glass member along a region to be fused, then superposes the other glass member on the one glass member with the glass layer interposed therebetween, and irradiates the glass layer with laser light along the region to be fused, so as to fuse the glass members to each other.

Meanwhile, a typical technique for burning a glass layer onto a glass member is one which removes an organic solvent and a binder from a paste layer containing a glass frit, a laser-light-absorbing pigment, the organic solvent, and the binder, so as to secure the glass layer to the glass member, and then heats the glass member having the glass layer secured thereto in a firing furnace, so as to melt the glass layer, thereby burning the glass layer onto the glass member (see, for example, Patent Literature 1).

For fixing a glass layer to a glass member, techniques for removing organic matters (organic solvents and binders) from the glass layer by irradiation with laser light instead of heating in the furnace have also been proposed (see, for example, Patent Literatures 2 and 3). Such techniques can prevent functional layers and the like formed on glass members from being worsened by heating and inhibit the energy consumption from being increased by the use of the furnace and the heating time from becoming longer in the furnace.

CITATION LIST

Patent Literature

Patent Literature 1: Japanese Translated International Application Laid-Open No. 2006-524419
Patent Literature 2: Japanese Patent Application Laid-Open No. 2002-366050
Patent Literature 3: Japanese Patent Application Laid-Open No. 2002-367514

SUMMARY OF INVENTION

Technical Problem

However, there have been cases where burning a glass layer onto a glass member by irradiation with laser light damages the glass member by generating cracks therein and so forth at the time of burning or at the time of fusing the glass members to each other thereafter.

In view of such circumstances, it is an object of the present invention to provide a glass fusing method which can manufacture a highly reliable glass fusing structure and a glass fixing method therefor.

Solution to Problem

For achieving the above-mentioned object, the inventor conducted diligent studies and, as a result, has found out that the burning of the glass layer by irradiation with laser light leads to damages to the glass member because of the fact that the laser light absorptance of the glass layer drastically increases when the temperature of the glass layer exceeds its melting point Tm as illustrated in FIG. 12 at the time of burning. That is, in the glass layer arranged on the glass member, scattering of light exceeding the absorption characteristic of the laser-light-absorbing pigment occurs because of the particle property of the glass frit and the like, so as to place it into a lower laser light absorptance state (e.g., it looks whiter under visible light).

When the glass layer is irradiated with laser light at such a laser power P that the glass layer attains a temperature Tp higher than the melting point Tm but lower than its crystallization temperature Tc as illustrated in FIG. 13, the glass powder loses its particle property upon melting and so forth, so that the absorption characteristic of the laser-light-absorbing pigment appears remarkably, whereby the laser light absorptance of the glass layer rises drastically (e.g., it looks darker or greener under visible light). As a consequence, the laser light is absorbed more than expected in the glass layer, so as to produce excess heat input, which causes a heat shock, thereby generating cracks in the glass member.

In practice, irradiation with the laser light at the laser power P causes the glass layer to reach a temperature Ta higher than the crystallization temperature Tc as illustrated in FIG. 13. When crystallized by excess heat input, a part of the glass layer located on the side opposite from the glass member onto which it is to be burned (i.e., the part of the glass layer located on the glass member to be fused) attains a higher melting point. This makes it necessary to emit the laser light with a higher laser power when fusing the glass members to each other thereafter so as to melt the part of the glass layer facing the glass member to be fused, whereby cracks occur in the glass member because of heat shocks caused by excess heat input as in the burning.

As illustrated in FIG. 14, the viscosity of the glass layer tends to decrease gradually until the temperature of the glass layer reaches the crystallization temperature Tc and increase gradually after the temperature of the glass layer exceeds the crystallization temperature Tc. This seems to be because, in the molten glass layer, a crystalline part precipitates and serves (together with expansion-coefficient-adjusting fillers made of ceramics and the like, if any, contained therein) as a nucleus for growing crystals, thereby lowering the fluidity of the glass layer. When the laser light absorptance drastically increases here as mentioned above, the temperature of the glass layer sharply rises together therewith from T1 to T2, for example, as illustrated in FIG. 14, whereby the viscosity of the glass layer rapidly becomes higher. As a result, bubbles formed in the molten glass layer by gasification of the binder are harder to be filled, so that the glass layer is solidified before decomposition gases of the binder completely escape therefrom. This may form a number of bubbles in the glass layer which, when connected to each other, may cause a leak in the glass layer in the glass fusing structure.

The inventor further conducted studies based on this finding and has completed the present invention. That is, the glass fusing method in accordance with the present invention is a glass fusing method for manufacturing a glass fusing structure by fusing first and second glass members to each other, the method comprising the steps of arranging a glass layer containing a binder, a laser-light-absorbing material, and a glass powder on the first glass member along a region to be fused; irradiating the glass layer with first laser light having a first heat input, so as to gasify the binder and melt the glass powder, and, while switching from the first heat input to a second heat input smaller than the first heat input when the melting ratio of the glass layer in a direction intersecting an advancing direction of the first laser light exceeds a predetermined value, irradiating the glass layer with the first laser light having the second heat input along the region to be fused, so as to gasify the binder and melt the glass powder, thereby fixing the glass layer to the first glass member; and superposing the second glass member on the first glass member having the glass layer fixed thereto with the glass layer interposed therebetween and irradiating the glass layer with the second laser light along the region to be fused, so as to fuse the first and second glass members to each other.

The glass fixing method in accordance with the present invention is a glass fixing method for manufacturing a glass-layer-fixed member by fixing a glass layer to a first glass member, the method comprising the steps of arranging a glass layer containing a binder, a laser-light-absorbing material, and a glass powder on the first glass member along a region to be fused; and irradiating the glass layer with first laser light having a first heat input, so as to gasify the binder and melt the glass powder, and, while switching from the first heat input to a second heat input smaller than the first heat input when the melting ratio of the glass layer in a direction intersecting an advancing direction of the first laser light exceeds a predetermined value, irradiating the glass layer with the first laser light having the second heat input along the region to be fused, so as to gasify the binder and melt the glass powder, thereby fixing the glass layer to the first glass member.

In the glass fusing method and glass layer fixing method, when melting the glass layer by irradiation with the first laser light along the region to be fused, the glass layer is irradiated with the first laser light having the first heat input along the region to be fused, so as to gasify the binder and melt the glass powder, and the heat input is switched when the melting ratio of the glass layer in a direction intersecting the advancing direction of the first laser light exceeds a predetermined value, so as to irradiate the glass layer with the first laser light having the second heat input smaller than the first heat input along the region to be fused, thereby gasifying the binder and melting the glass powder, thus fixing the glass layer to the first glass member. While the glass layer drastically increases its laser light absorptance when its melting ratio exceeds a predetermined value at the time of fixing, it is thereafter irradiated with the first laser light having the second heat input smaller than the first heat input, so that the glass layer is deterred from falling into an excess heat input state. Even when the glass layer is fixed to the first glass member by irradiation with the first laser light, such switching between heat inputs can prevent damages to the glass member such as cracks generated therein from occurring at the time of fixing the glass layer thereto and melting the glass members to each other thereafter. Further, such switching between heat inputs inhibits the glass layer from drastically increasing its viscosity because of a rapid temperature rise therein, so that decomposition gases of the binder are easier to escape from the molten glass layer. This can prevent a number of bubbles from being formed in the glass layer. Therefore, the glass fusing method and glass layer fixing method can manufacture a highly reliable glass fusing structure. By "heat input" is meant the energy density of the first laser light in its irradiation region. By "the melting ratio of the glass layer" is meant the ratio of "the width of the molten part of the glass layer" to "the whole width of the glass layer."

Preferably, in the glass fusing method in accordance with the present invention, the switching from the first heat input to the second heat input is effected by lowering the irradiation power of the first laser light. Since the heat input is switched by lowering the irradiation power, the shift from the first heat input to the second heat input can be achieved reliably in this case.

Preferably, in the glass fusing method in accordance with the present invention, the switching from the first heat input to the second heat input is effected by raising the advancing speed of the first laser light with respect to the glass layer. Since the heat input is switched by raising the advancing speed of the first laser light, the shift from the first heat input to the second heat input can be achieved reliably in this case. The switching by raising the advancing speed can also shorten the time required for fixing the glass layer. The "advancing speed of the first laser light with respect to the glass layer" means the relative advancing speed of the first laser light and encompasses the respective cases where the glass layer moves while the first laser light stands still, the first laser light moves while the glass layer stands still, and both of the first laser light and glass layer move.

Preferably, in the glass fusing method in accordance with the present invention, the switching from the first heat input to the second heat input is effected after a lapse of a predetermined time from the beginning of the irradiation with the first laser light. In this case, the shift from the first heat input to the second heat input can easily be achieved by a simple method of controlling the predetermined time obtained beforehand. Also, in glass layers having the same structure, substantially the same predetermined time can be used as long as the irradiation condition of the first laser light is the same, whereby a plurality of glass layers having the same structure can easily be molten continuously or simultaneously, so as to improve the manufacturing efficiency.

Preferably, in the glass fusing method in accordance with the present invention, the switching from the first heat input to the second heat input is effected when the intensity of thermal radiation light emitted from the glass layer rises to a predetermined value. In this case, the switching between heat inputs can be achieved accurately by detecting the intensity of the thermal radiation light having such a relationship with the melting ratio of the glass layer as to increase gradually as the latter rises.

Preferably, in the glass fusing method in accordance with the present invention, the switching from the first heat input to the second heat input is effected when the intensity of reflected light of the first laser light reflected by the glass layer drops to a predetermined value. In this case, the switching between heat inputs can be achieved accurately by detecting the intensity of the reflected light having such a relationship with the melting ratio of the glass layer as to decrease gradually as the latter rises.

Advantageous Effects of Invention

The present invention can manufacture a highly reliable glass fusing structure.

DESCRIPTION OF EMBODIMENTS

Figure 1:
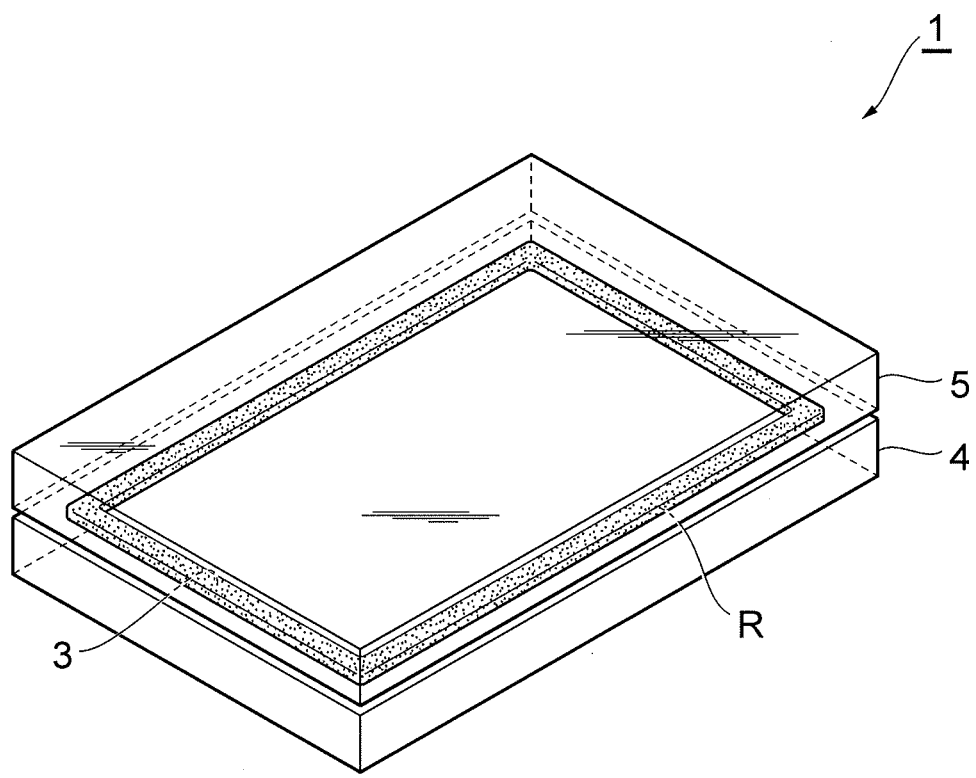
FIG. 1 is a perspective view of a glass fusing structure manufactured by an embodiment of the glass fusing method in accordance with the present invention.

In the following, preferred embodiments of the present invention will be explained in detail with reference to the drawings. In the drawings, the same or equivalent parts will be referred to with the same signs while omitting their overlapping descriptions.

FIG. 1 is a perspective view of a glass fusing structure manufactured by an embodiment of the glass fusing method in accordance with the present invention. As illustrated in FIG. 1, a glass fusing structure 1 is one in which a glass member (first glass member) 4 and a glass member (second glass member) 5 are fused to each other with a glass layer 3, which is formed along a region to be fused R, interposed therebetween. Each of the glass members 4, 5 is a rectangular sheet-shaped member having a thickness of 0.7 mm made of non-alkali glass, for example, while the region to be fused R is arranged like a rectangular ring with a predetermined width along the outer peripheries of the glass members 4, 5. The glass layer 3 is made of low-melting glass (vanadium-phosphate-based glass, lead-borate-based glass, or the like), for example, and formed into a rectangular ring with a predetermined width along the region to be fused R.

A glass fusing method (including a glass layer fixing method of producing a glass-layer-fixed member by fixing the glass layer 3 to the glass member 4 in order to manufacture the glass fusing structure 1 by fusing the glass members 4, 5 to each other) for manufacturing the glass fusing structure 1 will now be explained.

Figure 2:
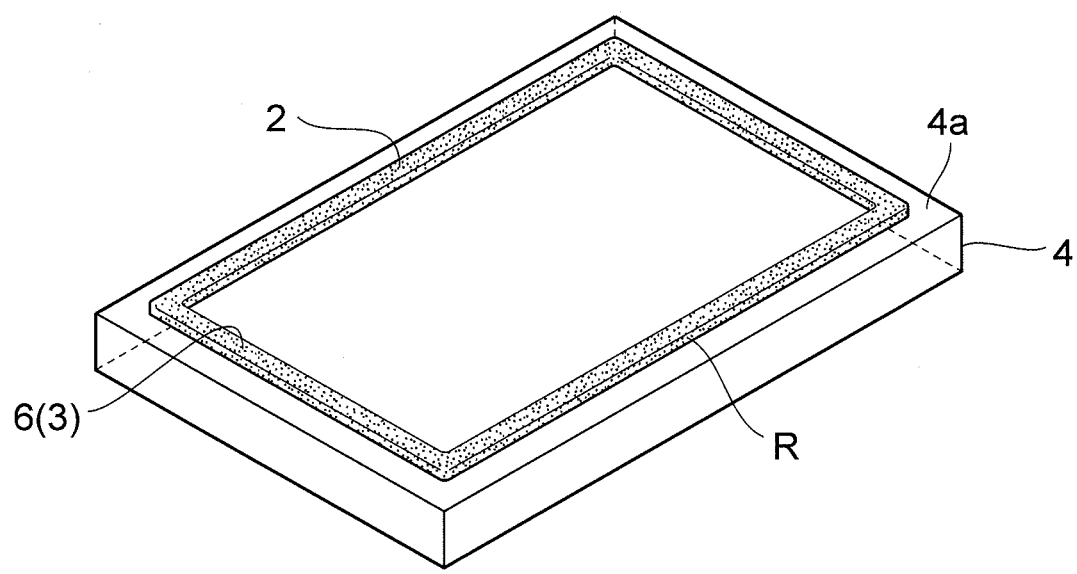
FIG. 2 is a perspective view for explaining the glass fusing method for manufacturing the glass fusing structure of FIG. 1.

First, as illustrated in FIG. 2, a frit paste is applied by a dispenser, screen printing, or the like, so as to form a paste layer 6 on a surface 4a of the glass member 4 along the region to be fused R. An example of the frit paste is one in which a powdery glass frit (glass powder) 2 made of low-melting glass (vanadium-phosphate-based glass, lead-borate-based glass, or the like), a laser-light-absorbing pigment (laser-light-absorbing material) which is an inorganic pigment such as iron oxide, an organic solvent such as amyl acetate, and a binder which is a resin component (nitrocellulose, ethylcellulose, acrylic, or the like) thermally decomposable at the softening point temperature of the glass or lower are kneaded.

The frit paste may also be one in which a glass frit (glass powder) produced by pulverizing low-melting glass doped beforehand with a laser-light-absorbing pigment (laser-light-absorbing material), an organic solvent, and a binder are kneaded. That is, the paste layer 6 contains the glass frit 2, laser-light-absorbing pigment, organic solvent, and binder.

Subsequently, the paste layer 6 is dried, so as to remove the organic solvent, whereby the glass layer 3 is secured to the surface 4a of the glass member 4 along the region to be fused R. As a consequence, the glass layer 3 containing the binder, laser-light-absorbing pigment, and glass fit 2 is arranged on the glass member 4 along the region to be fused R. Scattering of light exceeding the absorption characteristic of the laser-light-absorbing pigment occurs because of the particle property of the glass fit 2 and the like in the glass layer 3 secured to the surface 4a of the glass member 4, thereby placing it into a lower laser light absorptance state (e.g., it looks whiter under visible light).

Figure 3:
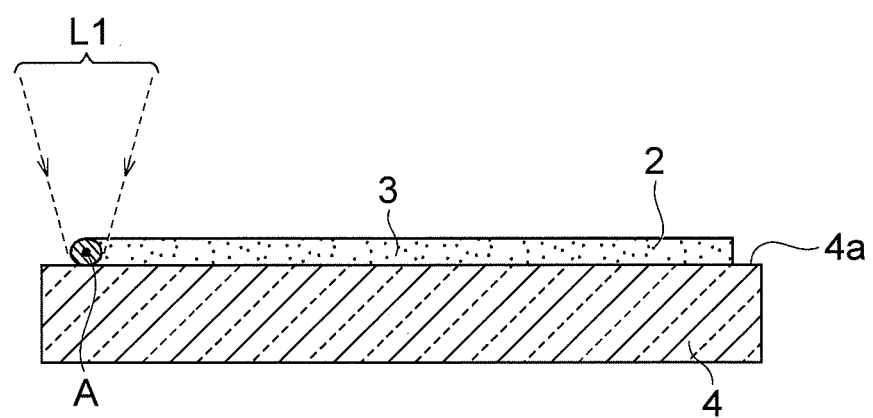
FIG. 3 is a sectional view for explaining the glass fusing method for manufacturing the glass fusing structure of FIG. 1.
Figure 4:
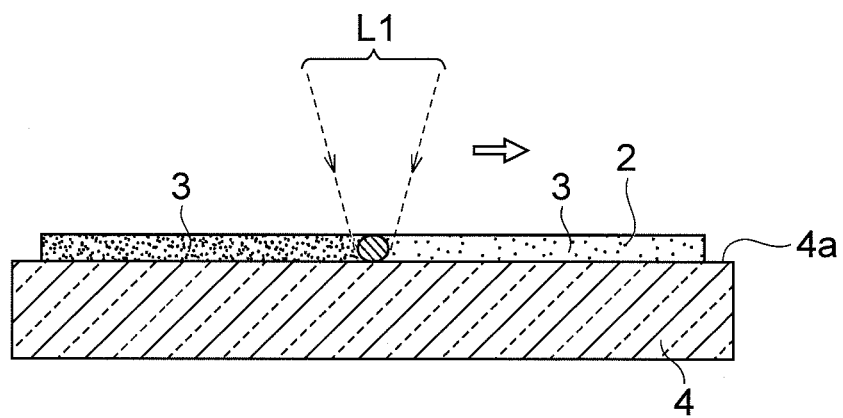
FIG. 4 is a sectional view for explaining the glass fusing method for manufacturing the glass fusing structure of FIG. 1.
Figure 5:
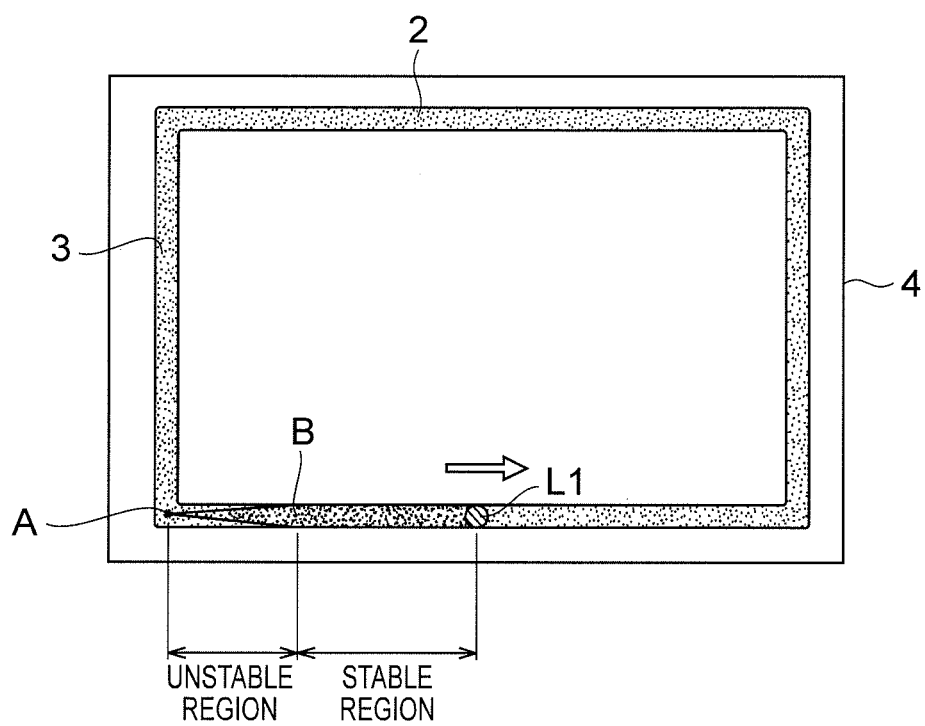
FIG. 5 is a plan view for explaining the glass fusing method for manufacturing the glass fusing structure of FIG. 1.
Figure 6:
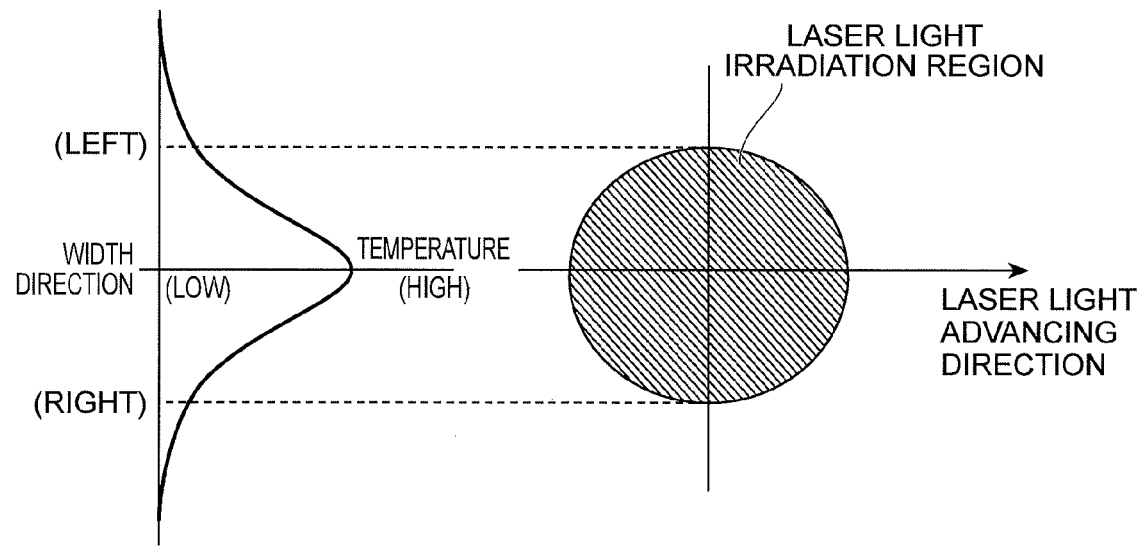
FIG. 6 is a chart illustrating a temperature distribution in laser irradiation.

Next, as illustrated in FIGS. 3 to 5, irradiation with laser light (first laser light) L1 is started with a converging spot located at an irradiation start position A in the region to be fused R of the glass layer 3 and then is progressed in the advancing direction of the depicted arrow along the region to be fused R. Meanwhile, as illustrated in FIG. 6, the laser light L1 has such a temperature distribution that the temperature is higher in a center part in its width direction (a direction substantially orthogonal to the advancing direction of the laser light L) and becomes lower toward both end parts. Therefore, as illustrated in FIG. 5, there is a predetermined distance from the irradiation start position A, where the melting ratio of the glass layer 3 (the ratio of the width of the molten layer 3 in the whole width of the glass layer 3 in the direction substantially orthogonal to the advancing direction of the laser light L) is substantially zero, to a stable region start position B beginning to form a stable region in which the melting ratio is nearly 100%, so that an unstable region in which the glass layer 3 melts partly in the width direction extends from the irradiation start position A to the stable region start position B.

Figure 7:
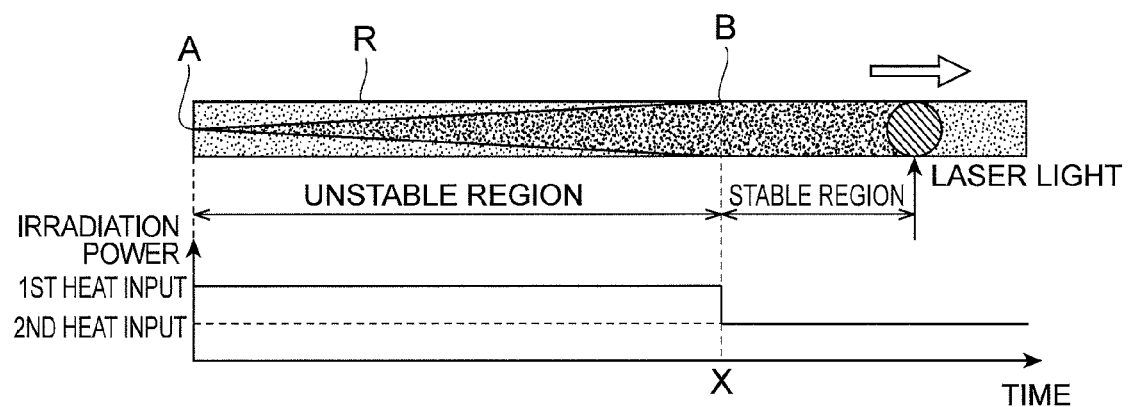
FIG. 7 is a diagram illustrating a switching timing for laser light irradiation conditions.

In the unstable region, the glass layer 3 is not molten in the whole width thereof, so that the laser light absorptance is not completely high. Therefore, as illustrated in FIG. 7, irradiation with the laser light L1 is started with a first heat input under such a strong irradiation condition that the glass layer 3 in the stable region crystallizes upon irradiation, e.g., an irradiation power of 10 W. The heat input, which can be represented by the following expression (1), varies depending on the irradiation power, since the advancing speed and spot diameter are kept constant in this embodiment.

$$\text{Heat input}(J/mm^2) = \text{power density}(J \cdot S/mm^2)/\text{advancing speed}(S) \quad (1)$$

Thereafter, when the irradiation reaches the stable region start position B, so as to yield the stable region where the glass layer 3 melts in the whole width thereof, the glass layer 3 attains a temperature at the melting point Tm or higher in the whole width thereof, so as to lose its particle property as the glass frit melts and so forth, whereby the absorption characteristic of the laser-light-absorbing pigment appears remarkably, thus drastically raising the laser light absorptance of the glass layer 3 in the whole width thereof, thereby yielding a melting ratio near 100% (e.g., it looks darker under visible light). As a consequence, the laser light L1 is absorbed more than expected in the glass layer 3, whereby the glass layer 3 inputs heat in excess.

Therefore, as illustrated in FIG. 7, after (or immediately before) a predetermined time X at which the melting ratio of the glass layer 3 becomes near 100%, i.e., immediately after the temperature of the glass layer 3 exceeds the melting point Tm in the whole width thereof so that its laser light absorptance drastically rises, the irradiation power of the laser light L1 is lowered from 10 W to 8 W, so as to switch the heat input from the first heat input at the irradiation power of 10 W to the second heat input at the irradiation power of 8 W. In this embodiment, the predetermined time X has been obtained beforehand for each structure of the glass layer 3, and the switching from the first heat input to the second heat input is effected by a simple method of controlling the predetermined time X obtained beforehand. Since the glass layers having the same structure melt to substantially the same extent with respect to the same heat input, substantially the same predetermined time X can be used when the irradiation condition of the laser light L1 is the same.

Thereafter, the glass layer 3 is kept being irradiated with the laser light L1 at the irradiation power of 8 W, which is the second heat input, along the region to be fused R until the laser light L1 returns to the irradiation start position A, whereupon the burning is terminated. If necessary, laser irradiations may be overlapped such that the unstable region is irradiated with the laser light L1 again so as to become the stable region.

Burning the glass layer 3 while switching between heat inputs as such melts and re-solidifies the glass layer 3 arranged on the glass member 4 while deterring it from crystallizing, whereby the glass layer 3 is burned and fixed onto the surface 4a of the glass member 4. As a result, a glass-layer-fixed member (i.e., the glass member 4 having the glass layer 3 fixed thereto) is manufactured. Such switching between heat inputs inhibits the glass layer 3 from drastically increasing its viscosity because of a rapid temperature rise therein, so that decomposition gases of the binder are easier to escape from the molten glass layer 3. This can prevent a number of bubbles from being formed in the glass layer 3. Here, the glass layer 3 burned onto the surface 4a of the glass member 4 loses its particle property as the glass fit 2 melts and so forth, thereby allowing the laser-light-absorbing pigment to exhibit its absorption characteristic remarkably, so as to attain a high laser light absorption state (e.g., it looks darker under visible light).

Figure 8:
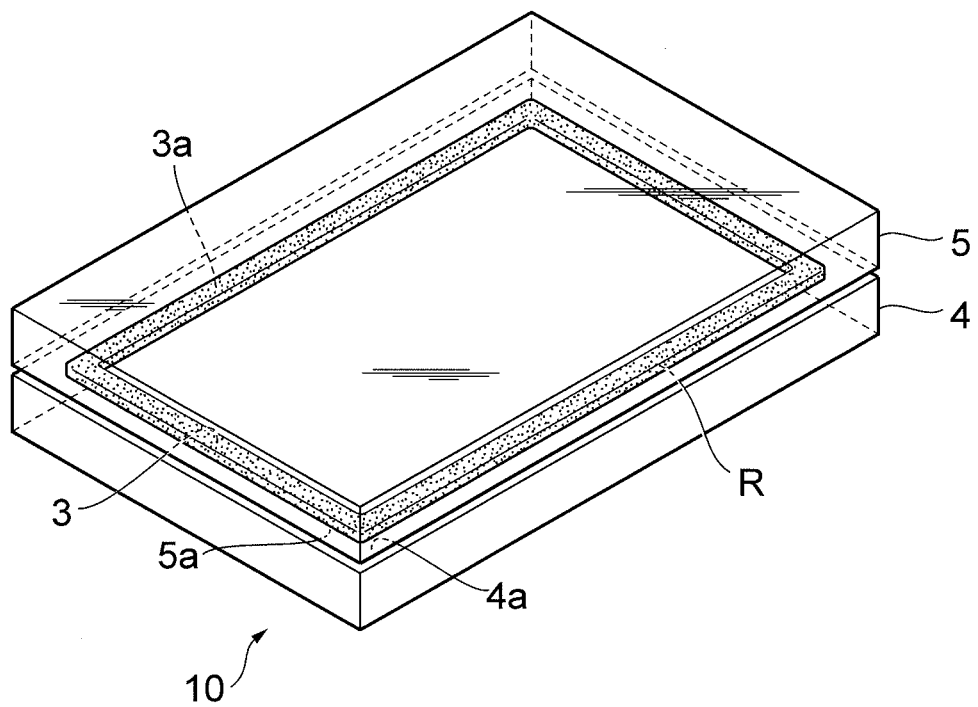
FIG. 8 is a perspective view for explaining the glass fusing method for manufacturing the glass fusing structure of FIG. 1.

After the burning of the glass layer 3 deterred from crystallizing all around the region to be fused R is completed, the glass member 5 is superposed on the glass-layer-fixed member 10 (i.e., the glass member 4 having the glass layer 3 fixed thereto) with the glass layer 3 interposed therebetween as illustrated in FIG. 8.

Figure 9:
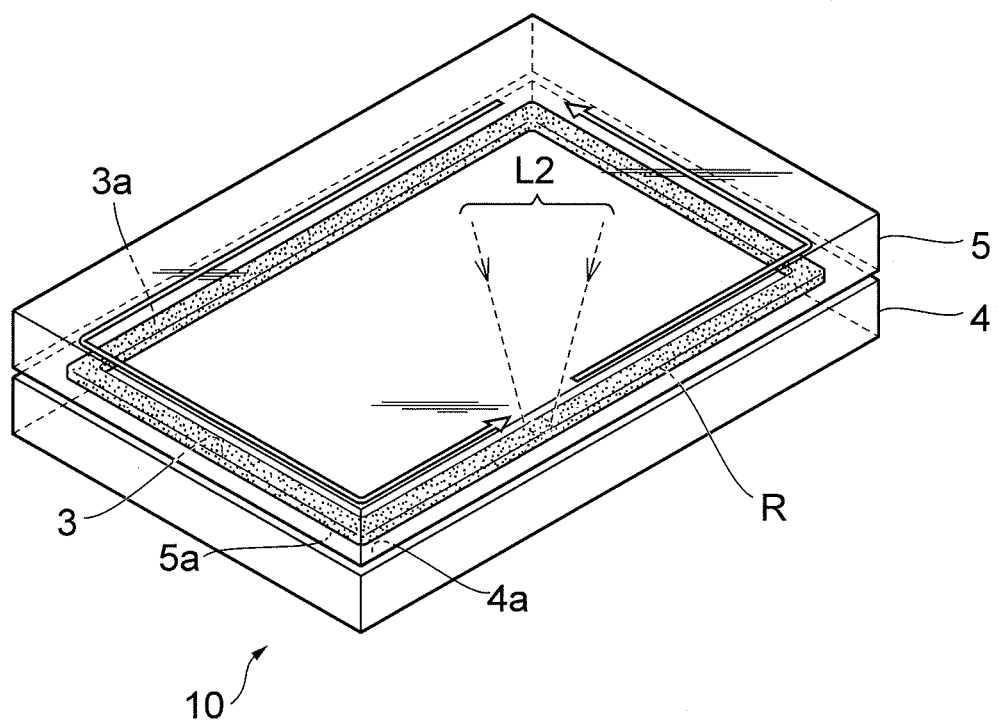
FIG. 9 is a perspective view for explaining the glass fusing method for manufacturing the glass fusing structure of FIG. 1.

Subsequently, as illustrated in FIG. 9, the glass layer 3 is irradiated with laser light (second laser light) L2 along the region to be fused R while locating a converging spot at the glass layer 3. As a consequence, the glass layer 3 in a uniform state having a high laser light absorptance while being deterred from crystallizing all around the region to be fused R absorbs the laser light L2, so that the glass layer 3 and its peripheral parts (the parts of surfaces 4a, 5a of the glass members 4, 5) melt and re-solidify, thereby bonding the glass members 4, 5 to each other (there is also a case where not the glass members 4, 5 but the glass layer 3 melts during fusing). Here, the glass layer 3 burned onto the glass member 4 is formed as a stable region deterred from crystallizing all around the region to be fused R, while the binder is fully removed, whereby the glass members 4, 5 are uniformly fused along the region to be fused R without raising the melting point of the glass layer 3 and prevented from being damaged.

As explained in the foregoing, when melting the glass layer 3 by irradiation with the laser light L1 along the region to be fused R, the glass fusing method (including the glass layer fixing method) for manufacturing the glass fusing structure 1 irradiates the glass layer 3 with the laser light L1 having the first heat input along the region to be fused R, so as to gasify the binder and melt the glass frit 2, and when the melting ratio of the glass layer 3 in a direction substantially orthogonal to the advancing direction of the laser light L1 is near 100%, the heat input is switched, so as to irradiate the glass layer 3 with the laser light L1 having the second heat input smaller than the first heat input along the region to be fused R, thereby gasifying the binder and melting the glass frit 2, thus fixing the glass layer 3 to the glass member 4. While the glass layer 3 drastically raises its laser light absorptance when its melting ratio is near 100% at the time of fixing, it is thereafter irradiated with the laser light L1 having the second heat input smaller than the first heat input and thus can be deterred from falling into an excess heat input state. Even when the glass layer 3 is fixed to the glass member 4 by irradiation with the laser light L1, such switching between heat inputs can prevent damages to the glass members 4, 5 such as cracks generated therein from occurring at the time of fixing the glass layer 3 thereto and melting the glass members 4, 5 to each other thereafter. Further, such switching between heat inputs inhibits the glass layer 3 from drastically increasing its viscosity because of a rapid temperature rise therein, so that decomposition gases of the binder are easier to escape from the molten glass layer 3. This can prevent a number of bubbles from being formed in the glass layer 3. Therefore, the glass fusing method and glass layer fixing method can manufacture the highly reliable glass fusing structure 1.

The above-mentioned glass fusing method effects the switching from the first heat input to the second heat input by lowering the irradiation power of the laser light L1. Since the heat input is switched by lowering the irradiation power as such, the shift from the first heat input to the second heat input can be achieved reliably.

In the above-mentioned glass fusing method, the melting ratio is near 100% at a predetermined time X from the beginning of irradiation with the laser light L1, whereupon the switching from the first heat input to the second heat input is effected. Therefore, the shift from the first heat input to the second heat input can easily be achieved by a simple method of controlling the predetermined time X, at which the melting ratio is near 100%, obtained beforehand. Also, in glass layers having the same structure, substantially the same predetermined time X can be used as long as the irradiation condition of the laser light L1 is the same, whereby a plurality of glass layers 3 having the same structure can easily be molten continuously or simultaneously, so as to improve the manufacturing efficiency greatly at the time of manufacturing a plurality of glass fused bodies 1.

In organic EL packages and the like, their containers themselves are small, so that thinner glass members 4, 5 are used, whereby low expansion glass is often chosen as a material for the glass members 4, 5 in order to make them harder to break. In this case, fillers made of ceramics and the like are contained in the glass layer 3 by a large amount in order for the coefficient of linear expansion of the glass layer 3 to match that of the glass members 4, 5 (i.e., in order to lower the coefficient of linear expansion of the glass layer 3). When containing fillers by a large amount, the glass layer 3 changes its laser light absorptance more greatly between before and after irradiation with the laser light L1. Therefore, the above-mentioned glass fusing method is effective in particular when low expansion glass is chosen as a material for the glass members 4, 5.

The present invention is not limited to the above-mentioned embodiment.

Figure 10:
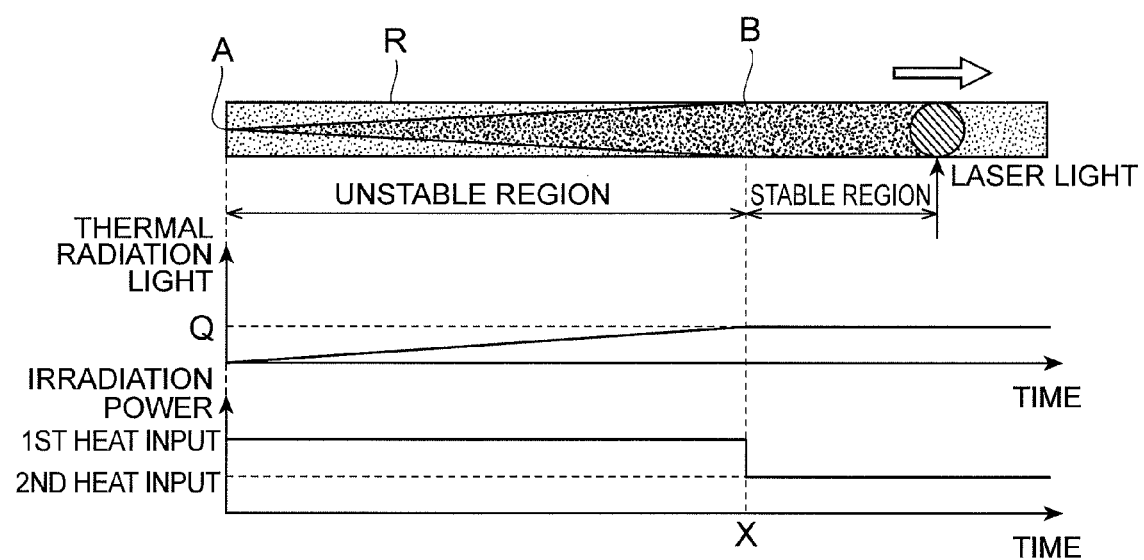
FIG. 10 is a diagram illustrating another switching timing for laser light irradiation conditions.
Figure 11:
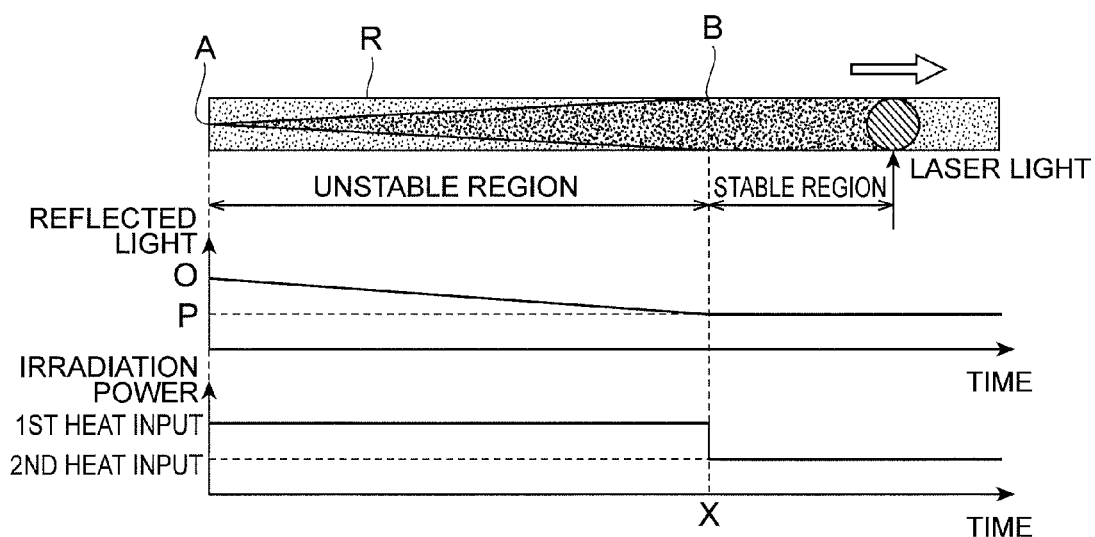
FIG. 11 is a diagram illustrating still another switching timing for laser light irradiation conditions.
Figure 12:
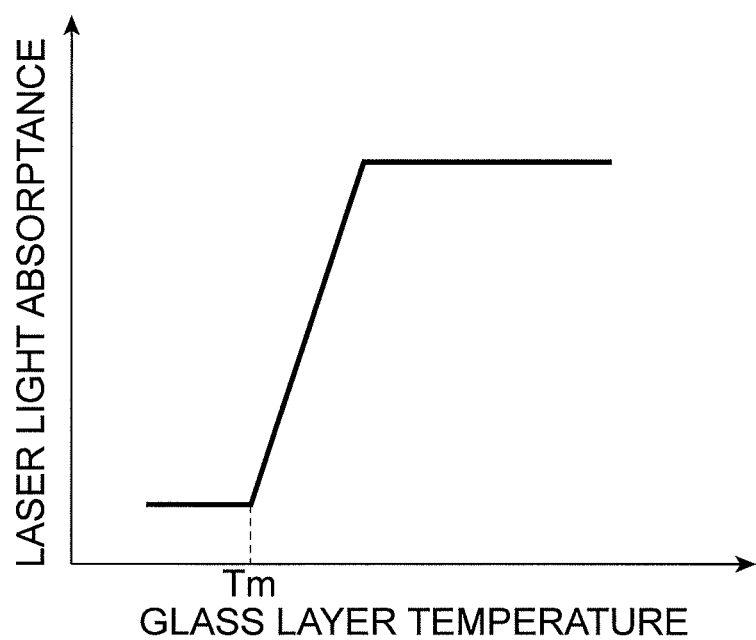
FIG. 12 is a graph illustrating the relationship between the temperature and laser light absorptance of the glass layer.
Figure 13:
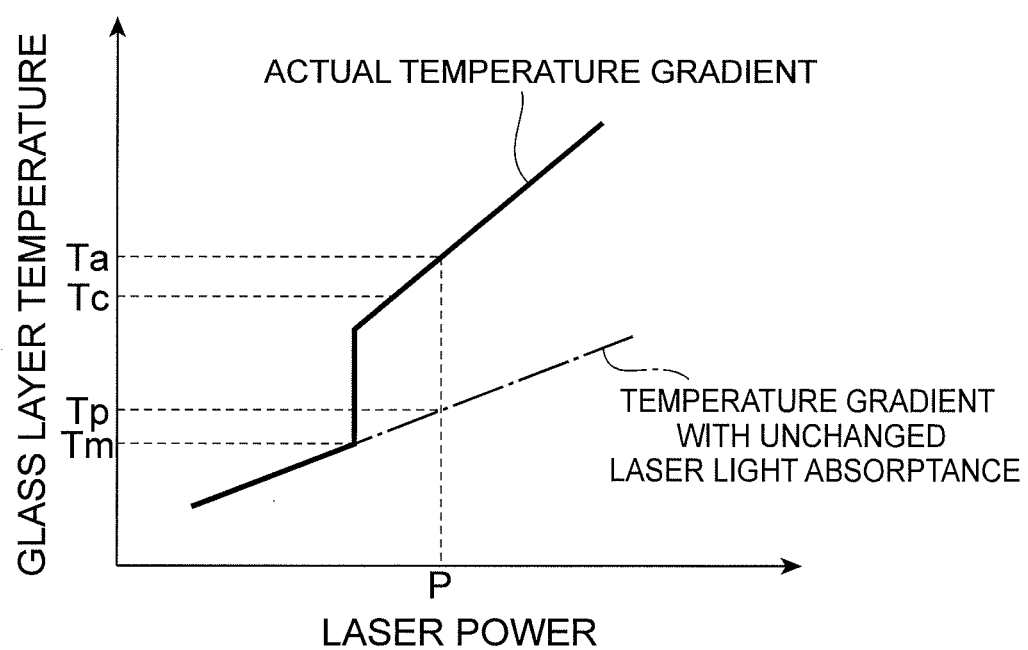
FIG. 13 is a graph illustrating the relationship between the laser power and the temperature of the glass layer.
Figure 14:
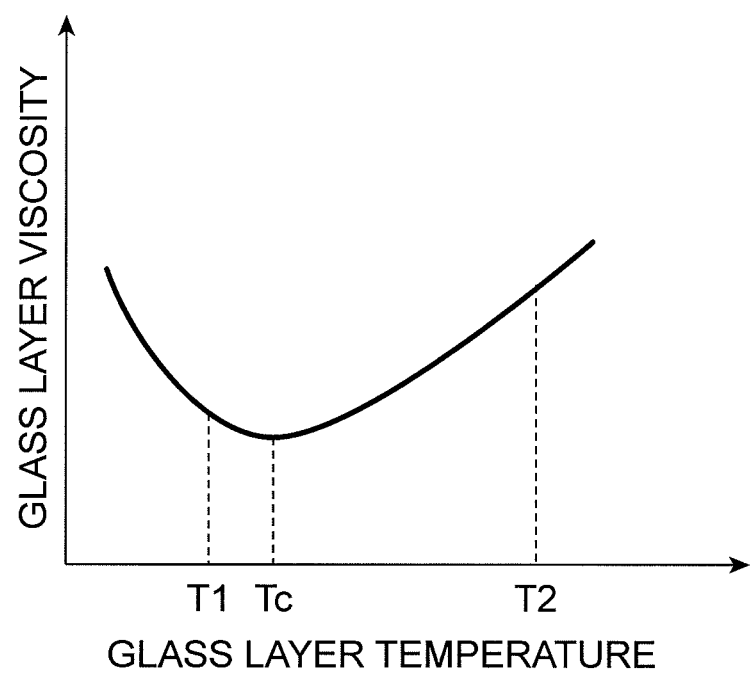
FIG. 14 is a graph illustrating the relationship between the temperature of the glass layer and the viscosity thereof.

For example, while the melting ratio is near 100% when the predetermined time X has elapsed after starting irradiation with the laser light L1 from the irradiation start position A, whereupon the switching from the first heat input to the second heat input is effected in the above-mentioned embodiment, the switching from the first heat input to the second heat input may be performed when the intensity of thermal radiation light emitted from the glass layer 3 rises to a predetermined value Q as illustrated in FIG. 10. In this case, the switching between heat inputs can be achieved accurately by detecting the intensity of the thermal radiation light having such a relationship with the melting ratio of the glass layer 3 as to increase gradually as the latter rises. Alternatively, as illustrated in FIG. 11, the switching from the first heat input to the second heat input may be performed when the intensity of reflected light of the laser light L1 reflected by the glass layer 3 drops to a predetermined value P. In this case, the switching between heat inputs can be achieved accurately by detecting the intensity of the reflected light having such a relationship with the melting ratio of the glass layer 3 as to decrease gradually as the latter rises.

While the above-mentioned embodiment controls the heat input to the glass layer 3 by changing the irradiation power of the laser light L1, the relative irradiation speed of the laser light L1 (i.e., the advancing speed of the laser light L1 with respect to the glass layer 3) may be raised while keeping the irradiation power of the laser light L1 constant, as represented by the above-mentioned expression (1), so as to perform the switching between heat inputs to the glass layer 3. Since the heat input is switched by raising the advancing speed of the laser light L1, the shift from the first heat input to the second heat input can be achieved reliably in this case. The switching by raising the advancing speed can also shorten the time required for fixing the glass layer 3. Since switching the heat input by raising the advancing speed often involves a speed accelerating process, it is preferred, from the viewpoint of deterring the glass layer 3 from crystallizing, for the switching control of the advancing speed to have started and completed before a timing to perform the switching (when the predetermined time X has passed or the intensity of the thermal radiation light or reflected light is a predetermined value) in practice.

Though the above-mentioned embodiment advances the laser light L1, L2 with respect to the secured glass members 4, 5, it is only necessary for the laser light L1, L2 to advance relative to each of the glass members 4, 5, whereby the glass members 4, 5 may be moved while securing the laser light L1, L2, or each of the glass members 4, 5 and the laser light L1, L2 may be moved.

Though the above-mentioned embodiment switches between heat inputs when the melting ratio is a predetermined value such as 100%, the switching between heat inputs may be effected when the melting ratio is a predetermined value such as 90%, for example, as long as the glass layer 3 is molten appropriately, so as to reliably deter the glass layer 3 from crystallizing. However, switching between heat inputs when the melting ratio is low may make the laser light absorption insufficient after the switching, thus failing to keep the process for melting the glass layer, whereby the predetermined value of melting ratio for switching between heat inputs is preferably at least 80%.

While the above-mentioned embodiment directly irradiates the glass layer 3 with the laser light L1, the glass layer 3 may be irradiated with the laser light L1 through the glass member 4.

INDUSTRIAL APPLICABILITY

The present invention can manufacture a highly reliable glass fusing structure.

REFERENCE SIGNS LIST

1 . . . glass fusing structure; 2 . . . glass frit (glass powder); 3 . . . glass layer; 4 . . . glass member (first glass member); 5 . . . glass member (second glass member); 6 . . . paste layer; 10 . . . glass-layer-fixed member; A . . . irradiation start position, B . . . stable region start position; R . . . region to be fused; L1 . . . laser light (first laser light); L2 . . . laser light second laser light)

The invention claimed is:

1. A glass fusing method for manufacturing a glass fusing structure by fusing first and second glass members to each other, the method comprising the steps of:

arranging a glass layer containing a binder, a laser-light-absorbing material, and a glass powder on the first glass member along a region to be fused;

irradiating the glass layer with first laser light having a first heat input, so as to gasify the binder and melt the glass powder, and, while switching from the first heat input to a second heat input smaller than the first heat input when the melting ratio of the glass layer in a direction intersecting an advancing direction of the first laser light exceeds a predetermined value, irradiating the glass layer with the first laser light having the second heat input along the region to be fused, so as to gasify the binder and melt the glass powder, thereby fixing the glass layer to the first glass member; and superposing the second glass member on the first glass member having the glass layer fixed thereto with the glass layer interposed therebetween and irradiating the glass layer with the second laser light along the region to be fused, so as to fuse the first and second glass members to each other.

2. A glass fusing method according to claim 1, wherein the switching from the first heat input to the second heat input is effected by lowering the irradiation power of the first laser light.

3. A glass fusing method according to claim 1, wherein the switching from the first heat input to the second heat input is effected by raising the advancing speed of the first laser light with respect to the glass layer.

4. A glass fusing method according to claim 1, wherein the switching from the first heat input to the second heat input is effected after a lapse of a predetermined time from the beginning of the irradiation with the first laser light.

5. A glass fusing method according to claim 1, wherein the switching from the first heat input to the second heat input is effected when the intensity of thermal radiation light emitted from the glass layer rises to a predetermined value.

6. A glass fusing method according to claim 1, wherein the switching from the first heat input to the second heat input is effected when the intensity of reflected light of the first laser light reflected by the glass layer drops to a predetermined value.

7. A glass fixing method for manufacturing a glass-layer-fixed member by fixing a glass layer to a first glass member, the method comprising the steps of:

arranging a glass layer containing a binder, a laser-light-absorbing material, and a glass powder on the first glass member along a region to be fused; and irradiating the glass layer with first laser light having a first heat input, so as to gasify the binder and melt the glass powder, and, while switching from the first heat input to a second heat input smaller than the first heat input when the melting ratio of the glass layer in a direction intersecting an advancing direction of the first laser light exceeds a predetermined value, irradiating the glass layer with the first laser light having the second heat input along the region to be fused, so as to gasify the binder and melt the glass powder, thereby fixing the glass layer to the first glass member.

* * * * *